United States Patent [19]

Sturm

[11] 4,113,461
[45] Sep. 12, 1978

[54] HOOD FOR GLASS FURNACE GATHERING HOLE

[76] Inventor: Michael R. Sturm, 137 Ridgeway Dr., Bridgeport, W. Va. 26330

[21] Appl. No.: 833,264

[22] Filed: Sep. 14, 1977

[51] Int. Cl.² .............................................. C03B 5/26
[52] U.S. Cl. ...................................... 65/324; 65/336; 65/375
[58] Field of Search ............... 65/134, 136, 326, 327, 65/335, 347, 27, 62, 324, 336, 375

[56] References Cited

U.S. PATENT DOCUMENTS

| 254,572 | 3/1882 | Siemens | 65/336 |
|---|---|---|---|
| 2,038,797 | 4/1936 | Lufkin | 65/340 |
| 2,890,547 | 6/1959 | Lyle | 65/134 |
| 2,994,519 | 8/1961 | Zellers, Jr. | 65/337 X |
| 3,193,268 | 7/1965 | Robertson et al. | 263/40 |
| 3,596,889 | 8/1971 | Hanks | 263/11 |

FOREIGN PATENT DOCUMENTS 7,132,676  5/1968  Japan .................................... 65/134

Primary Examiner—Arthur D. Kellogg
Attorney, Agent, or Firm—Buell, Blenko & Ziesenheim

[57] ABSTRACT

The specification discloses a hood for the gathering hole of a glass furnace which minimizes the escape of hot gases through the gathering hole while open for removal of glass from the furnace to reduce air pollution and otherwise improve personnel comfort.

5 Claims, 4 Drawing Figures

HOOD FOR GLASS FURNACE GATHERING HOLE

This invention relates to a hood for the gathering hole of a glass furnace which reduces air pollution and otherwise improves the comfort of personnel engaged in removing glass from the furnace.

Glass is produced by heating a mixture of sand, sodium carbonate, and calcium carbonate in a furnace, removing the molten mixture from the furnace, shaping it into a desired form and allowing the mixture to cool to a rigid condition. Glass making furnaces contain one or more openings in their front end called gathering holes through which molten glass is removed. Stoppers or plugs are provided for the gathering holes which are closed while the mixture of sand, sodium carbonate and calcium carbonate is heated but must be removed to enable the molten glass to be extracted. When these stoppers are removed, hot gases escape from the furnace causing the furnace to lose heat, as well as creating a potential health hazard and discomfort for workers near the gathering hole due to heat and pollution of the air outside the furnace.

It is the object of my invention to provide an auxiliary device for glass furnaces for inhibiting the escape of hot gases from the furnace while the gathering hole is open, and which at the same time does not interfere with insertion and removal of conventional apparatus by which glass is removed from the furnace through the gathering holes.

To attain the object of my invention, I provide a hood of refractory material and elongate shape, capable of insertion into the gathering hole from the outside of the furnace.

I further provide a hood of the type described which comprises a substantially U-shaped body closed along the top and open along the bottom, with the outer end of the bottom recessed to form an inner shoulder that rests on the inside surface of the furnace wall, and with a collar at the outer end of the body which engages the furnace wall at the top of the gathering hole to prevent inward tilting of the hood body.

A more detailed description of my invention will be given hereinafter in connection with the accompanying drawings, wherein.

Figure 1:
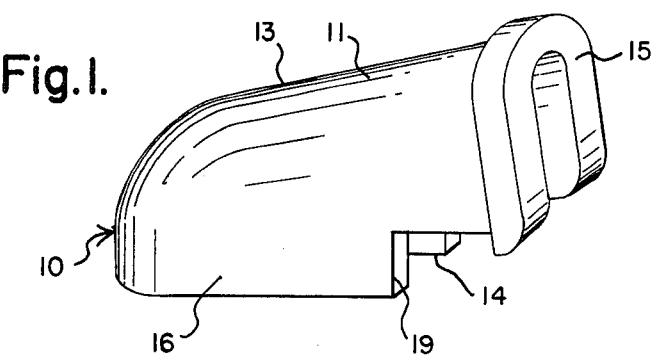
FIG. 1 is a perspective view of a preferred embodiment of a hood embodying my invention.
Figure 2:
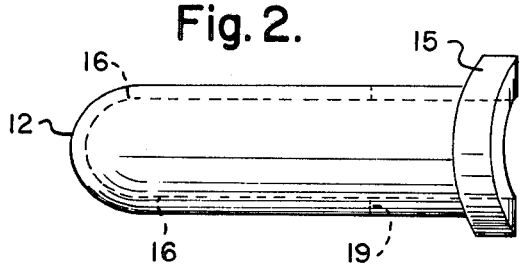
FIG. 2 is a plan view of the embodiment of FIG. 1, on slightly smaller scale.
Figure 3:
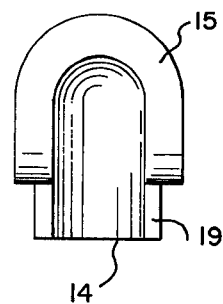
FIG. 3 is a front end view of the embodiment of FIG. 1, on slightly smaller scale.

Referring to the drawings, the hood 10 comprises an elongated body 11, of refractory material, having a cross-section of inverted U-shape. The inner end wall 12 curves downwardly from the top 13 to the open bottom 14 of the body. At the outer end of the body is a collar 15 of inverted U-shape which is slanted toward the inner end wall and which projects radially beyond the side walls 16 of the body. The body 11 is of a width closely conforming to the width of the gathering hole 17 in the furnace wall 18 and enabling it to be inserted longitudinally into the gathering hole.

The bottom edges of the side walls 16 are formed at the front end with notches or recesses 19 by which the hood seats on the furnace wall within the gathering hole. The diameter of the collar 15 such as to engage a shoulder 20 at the upper margin of the gathering hole, upon insertion of the hood 10 into the hole.

Figure 4:
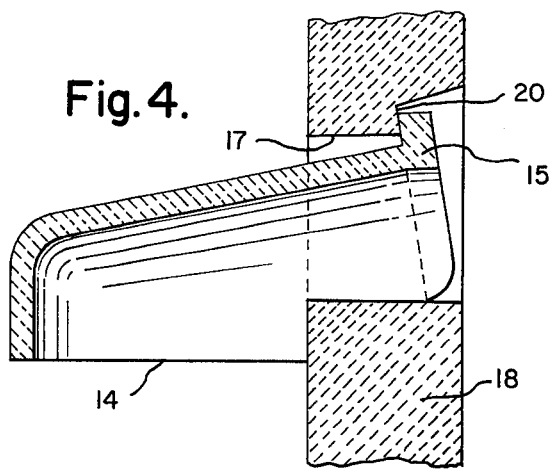
FIG. 4 is a longitudinal sectional view through the hood shown in FIG. 1, while positioned in the gathering hole of a furnace.

As seen in FIG. 4, upon insertion of the hood 10 into the gathering hole 17, the inner portion of the body drops down to a position in which the recesses 19 seat on the inner surface of the furnace wall and on the bottom surface of the gathering hole 17. At the same time, the body of the hood 10 fulcrums about the area of contact of the recess 19 with the furnace wall 18 due to its weight, thus allowing the upper portion of collar 15 to seat against the shoulder 20 in the gathering hole 17. At the same time the side edges of the collar 15 engage the side walls of the furnace wall in the gathering hole. It will thus be understood that with the hood 10 seated in the gathering hole as described, and with the bottom surface of the hood in close proximity to or submerged in molten glass within the furnace, the escape of hot gases from the interior of the furnace through the gathering hole is effectively inhibited.

It is thus possible, by the use of the hood constituting my invention, to enable removal of molten glass from the furnace through the gathering hole while open without discomfort to or endangering the health of personnel in proximity to the furnace at the time.

While I have shown and described a preferred embodiment of the invention, it will be apparent that the invention is not limited to the specific structure thereof but may be variously embodied within the scope of the following claims.

I claim:

1. A hood for a glass furnace gathering hole comprising:
    (a) a hollow elongated body member of generally inverted U-shape having two side walls, a closer rear end wall, an open front end, and an open bottom, said body being adapted to fit longitudinally through the gathering hole in the wall of a glass furnace and so seat on the bottom edges of said two side walls as to cause said rear end wall to tilt down into the furnace; and
    (b) a collar of inverted U-shape integral with the body member at the open front end thereof, said collar being of a diameter greater than that of the glass furnace gathering hole for engaging the furnace wall at the gathering hole in the tilted position of the body member to provide a seal and for preventing the body member from passing completely through the gathering hole.

2. The hood set forth in claim 1, wherein the body member and collar are constructed of refractory material.

3. The hood set forth in claim 1, wherein said collar is inclined backwardly toward the closer rear end wall.

4. The hood set forth in claim 1, wherein the top of the body member is sloped downwardly from the said collar to the closed rear end wall.

5. The hood set forth in claim 1, wherein the bottom edges of the said side walls are recessed at the front end of the body member to provide a seat for said body member on the furnace wall at the gathering hole on which the said body member fulcrums to effect sealing engagement of the said collar with the furnace wall at the gathering hole.

* * * * *

UNITED STATES PATENT AND TRADEMARK OFFICE
CERTIFICATE OF CORRECTION

PATENT NO. : 4,113,461
DATED : September 12, 1978
INVENTOR(S) : Michael R. Sturm It is certified that error appears in the above-identified patent and that said Letters Patent are hereby corrected as shown below:

Column 2, Claim 3, line 57, "closer" should read --closed--.

Signed and Sealed this

Twenty-sixth Day of December 1978

[SEAL]

Attest:

RUTH C. MASON
Attesting Officer

DONALD W. BANNER
Commissioner of Patents and Trademarks